United States Patent
Viassolo et al.

(10) Patent No.: US 9,618,919 B2
(45) Date of Patent: Apr. 11, 2017

(54) REAL-TIME SCHEDULING OF LINEAR MODELS FOR CONTROL AND ESTIMATION

(75) Inventors: Daniel Edgardo Viassolo, Schenectady, NY (US); Avinash Vinayak Taware, Rexford, NY (US); Brent Jerome Brunell, Clifton Park, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 2335 days.

(21) Appl. No.: 12/473,413

(22) Filed: May 28, 2009

(65) Prior Publication Data

US 2010/0305912 A1  Dec. 2, 2010

(51) Int. Cl.
 *G06G 7/48*  (2006.01)
 *G05B 17/02* (2006.01)

(52) U.S. Cl.
 CPC .................................. *G05B 17/02* (2013.01)

(58) Field of Classification Search
 CPC ............. F02B 69/06; F02D 2041/1433; F02D 2041/1422; F02D 2041/1429; G05B 17/00; G05B 17/02; G05B 13/042; G05B 13/04
 USPC ...... 703/2, 6–8; 706/13; 701/32.1, 100, 101, 701/110, 123
 See application file for complete search history.

(56) References Cited

U.S. PATENT DOCUMENTS

| | | | | |
|---|---|---|---|---|
| 5,094,213 A | * | 3/1992 | Dudek et al. | 477/121 |
| 7,472,100 B2 | * | 12/2008 | Volponi et al. | 706/45 |
| 8,117,017 B2 | * | 2/2012 | Ellis et al. | 703/7 |
| 2009/0248371 A1 | * | 10/2009 | Khial | 703/2 |

OTHER PUBLICATIONS

Rosa et al. "Autolanding Controller for a Fixed Wing Unmanned Air Vehicle". AIAA Guidance, Navigation and Control Conference and Exhibit, Aug. 2007., 22 Pages.*
Endurthi "Linearization and Health estimation of a turbofan engine". Thesis at Cleveland State University., Dec. 2004. 122 Pages.*
Atkinson., "Development of an Aerodynammic Table Lookup system and Landing Gear Model for the Cal Poly Flight Simulator"., California Polytechinc State University., 2002., 59 Pages.*

(Continued)

*Primary Examiner* — Eunhee Kim
(74) *Attorney, Agent, or Firm* — John P. Darling

(57) ABSTRACT

A method of generating linear models for a physical system of interest is implemented in steps including, first, determining offline, a set of linear models for the physical system of interest by linearization of a nonlinear computational model of the physical system of interest at selected operating points or from desired data; second, analyzing offline, accuracy of each linear model and eliminating inaccurate linear models therefrom to provide a residual set of linear models; third, generating offline, linear models corresponding to grid points of one or more lookup tables based on the residual set of linear models; fourth, associating offline, lookup table grid points with selected scheduling variables, and fifth, generating algorithmic software for the physical system therefrom such that linear models for the physical system generated offline form the basis for online scheduling of linear models.

33 Claims, 2 Drawing Sheets

(56) References Cited

OTHER PUBLICATIONS

Figure 1:
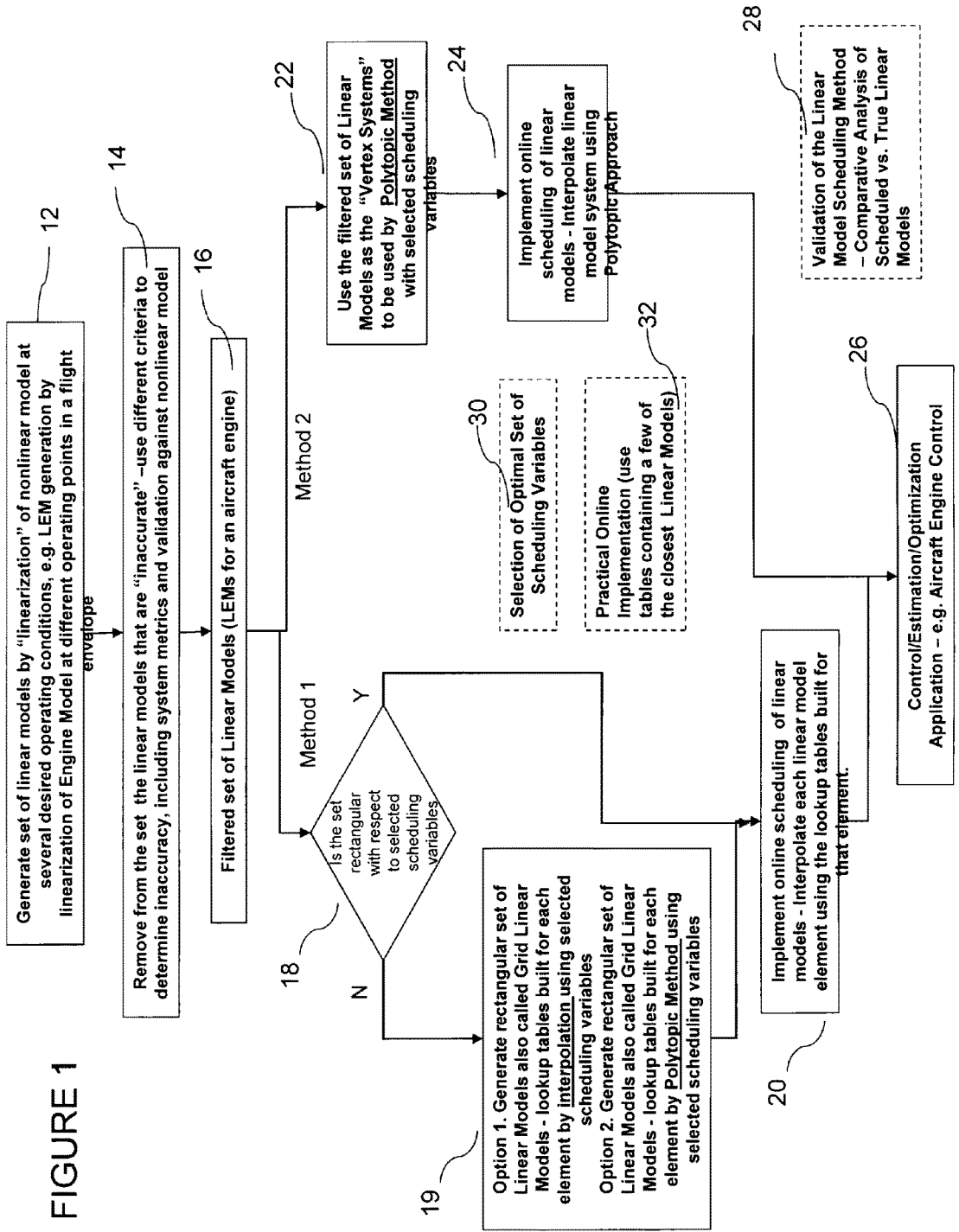

Hwang et al. "Applications of Polytopic Approximations of Reachable Sets to Linear Dynamic Games and a Class of Nonlinear Systems"., American Control Conference, 2003. Proceedings of the 2003., 7 Pages.*
Pineiro et al. "Real-Time Parameter Identification Applied to Flight Simulation"., 1993 IEEE. p. 290-301.*
Duke et al. "User's Manual for LINEAR, a Fortran Program to Derive Linear Aircraft Models"., NASA Technical Paper 2768. Dec. 1987. 109 Pages.*

* cited by examiner

REAL-TIME SCHEDULING OF LINEAR MODELS FOR CONTROL AND ESTIMATION

STATEMENT REGARDING FEDERALLY SPONSORED RESEARCH & DEVELOPMENT

This invention was made with Joint Program Office support under contract number N00019-04-C-0093. The Government has certain rights in the invention.

BACKGROUND

This invention relates generally to dynamic system modeling, control and estimation applications, and more particularly, to a method for accurate and efficient generation of linear models (LMs) at any given operating point of a nonlinear physical system of interest, where the linear models are available for subsequent use in real-time.

Generally, but not limited to, avionics, applications generate controller gains offline, and then implement these controller gains as scheduled gains in a corresponding Full Authority Digital Engine Controller (FADEC). Some advanced applications however, require online generation of linear models, termed Linear Engine Models (LEMs), in the FADEC; controller gains are then computed in real-time using these LEMs.

Linear models are needed in cases where parameters of control, estimation and/or detection algorithms are computed online, from a current representation of a dynamic system (i.e. linear model (LM) or, for aircraft engine controls applications, more specifically would be a Linear Engine Model (LEM)), to thus adapt these parameters to changes in the system responses due to different operating points, variation from system to system, or deterioration in the health/performance of the dynamic system.

It would be desirable to provide a method of generating real-time accurate and efficient linear models at substantially any given operating point of the physical system of interest, where the linear models are subsequently used on line for control, estimation, and/or detection purposes associated with the dynamic physical system.

BRIEF DESCRIPTION

Briefly, in accordance with one embodiment, a method of generating online linear models for a physical system of interest comprises:
determining offline, a set of linear models for the physical system of interest by linearization of a nonlinear computational model of the physical system of interest at selected operating conditions;
analyzing offline, accuracy of each linear model and eliminating inaccurate linear models therefrom to provide a residual set of linear models;
generating offline, linear models corresponding to grid points of one or more lookup tables defined using selected scheduling variables based on the residual set of linear models;
generating algorithmic software for the physical system therefrom such that linear models for the physical system generated offline form the basis for online scheduling of linear models.

According to another embodiment, a method of generating linear engine models offline for use in subsequent online scheduling of linear engine models comprises the steps of:
determining a primary set of linear engine models by linearization of a nonlinear computational model at selected operating points;
analyzing the accuracy of each primary linear engine model and eliminating inaccurate primary linear engine models therefrom to provide a secondary set of linear engine models;
generating linear engine models corresponding to grid points of one or more lookup tables based on the secondary set of linear engine models;
associating lookup table grid points with selected scheduling variables; and
generating algorithmic software configured to assist online scheduling of linear engine models in response to the lookup table grid points and the selected scheduling variables.

DRAWINGS

Figure 2:
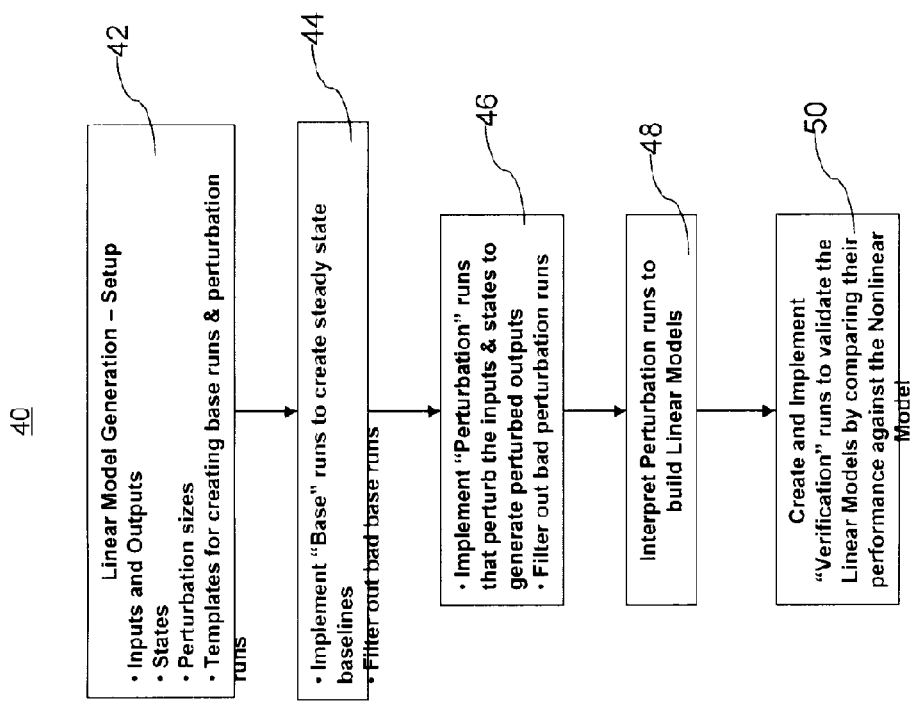

These and other features, aspects, and advantages of the present invention will become better understood when the following detailed description is read with reference to the accompanying drawing in which like characters represent like parts throughout the drawings, wherein:

FIG. 1 is a flowchart illustrating a method of generating tables for linear model scheduling according to one embodiment of the present invention; and FIG. 2 is a flow chart illustrating a process for generating a linear model according to one embodiment of the present invention.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Although the invention is described in context of an aircraft engine control application as an exemplary embodiment, it applies to any physical system that needs linear models to drive needs such as but not limited to control, optimization and parameter estimation. In particular, some control and constraint handling algorithms directed to avionics applications make use of linearized models of an engine at different flight conditions. These linear models are defined herein as Linear Engine Models, or LEMs.

More precisely, a LEM according to one embodiment is defined by matrices A, B, C, D that relate inputs u, outputs y, and states x of the discrete time linearized system as represented by $$x(k+1)=A*x(k)+B*u(k) \qquad \text{Eq. 1}$$

$$y(k)=C*x(k)+D*u(k) \qquad \text{Eq. 2}$$

where 'k' represents the sampling instant in time. At the same time, a continuous time LEM can be defined as well.

Generally, LEMs can be obtained in two different ways. These include: 1) analytically, or in closed-form, by deriving equations for partial derivatives from equations of a physics-based (nonlinear) model of the engine; and 2) numerically, by considering a nonlinear engine model as a black box, namely, by perturbing model inputs and states from the current engine operating point, collecting the perturbed model state derivatives and outputs, and obtaining the corresponding partials from them. Only numerically obtained LEMs are considered herein as an exemplary embodiment.

In principle, every time the engine controller needs to perform its computations, it requires the "appropriate" LEM. That is, the LEM obtained by linearizing the engine model at the current engine state (i.e., current engine speeds, thermal states, etc.) and engine inputs (i.e., current fuel flow, altitude, engine speed, etc.). There are two options to satisfy this need: 1) online LEM computation. That is, any time the engine controller requires a LEM, a numerical linearization routine is called with the current engine operating point as the main input. Other inputs are the perturbations sizes and the engine model to be used; and 2) offline LEM computation with online LEM scheduling. LEMs corresponding to different engine operating conditions are computed offline in advance. Later, at runtime, these LEMs are scheduled or "interpolated" such that an appropriate LEM is available for any engine operating condition. The embodiments described herein with reference to the figure employ offline LEM computation with online scheduling.

The challenge with online computation of LEM or a linear model in general is the computational load involved in calculations of partial derivatives by perturbing the nonlinear model, which are often very complex involving states as well as algebraic solvers. At the same time, these calculations need to be completed within a very short time frame for real time control of physical systems such as but not limited to aircraft engines. This demands fast processors with significantly large and fast memory. Often the on-board computers used in industrial applications such as but not limited to aircraft engine control are limited in processing power and memory. This limitation makes the offline linear model generation feeding online scheduling of linear models more feasible method for real time applications such as but not limited to control, optimization and estimation than the online computation of linear model.

The flowchart illustrated in FIG. 1 summarizes the steps performed offline to generate tables for linear model scheduling that are implemented and used online in real-time according to particular embodiments. These method steps are described in further detail below according to particular aspects of the invention. More particularly, the flowchart will be explained illustratively as a method of generating tables for linear engine model scheduling according to particular embodiments of the present invention. According to one embodiment, these steps are performed offline.

Further issues of consideration to develop and implement a LEM scheduling technique according to the embodiments described herein include 1) selection of the set of pre-computed LEMs, namely, subject to given memory constraints, how many and where to place the points in the engine input-state domain to be used for the offline linearization; 2) optimal selection of the scheduling variables; that is, from the set of engine inputs and outputs available for online scheduling (i.e., those that can be sensed), which signals are best qualified to decide which LEM is to be used at any given operating condition; 3) selection of the scheduling technique; that is, to choose an algorithm to go from the current value of the scheduling variables to the final interpolated or scheduled LEM to be used by the engine controller; and 4) validation of the whole LEM scheduling approach.

Approaches taken in response to the foregoing issues of consideration are described in further detail below according to particular embodiments of the invention and have yielded workable results. These issues of consideration are inter-related but; for the sake of clarity, they are treated fairly independently herein.

With continued reference now to FIG. 1, the embodied method of generating tables for online LEM scheduling commences in block 12 by pre-computing a plurality of LEMs corresponding to all flight modes of an aircraft engine over the entire flight envelope. According to one embodiment, these LEMs are based on a suitable non-linear offline engine model. Non-linear engine modeling techniques are known in the art of engine modeling; and since the non-linear engine model employed will depend upon the particular application, these engine models are not discussed further herein to preserve brevity and to enhance clarity in understanding the principles discussed herein. The goal is to compute LEMs in order to cover a flight envelope in a fairly uniform fashion.

There are some (obvious) differences between different flight modes of an aircraft engine, from the point of view of the variables that defined the operating points selected and their ranges to cover the flight envelope. In other words, the operating envelopes for different flight modes differ. To cover one flight mode envelope, the aircraft speed, altitude, engine power level and ambient temperature are "uniformly sampled". It is noted that engine deterioration level can also be varied to generate LEMs from new to fully deteriorated engines. This helps the controller to adapt and be robust to engine health deterioration. At the same time, LEMs could be generated with variation in engine actuators and sensors introduced into the engine model.

Due to different reasons, a number of the LEMs generated may not be correct, and contain wrong partial derivatives (also called partials, or coefficients). Some of the reasons are varying sensitivity of the nonlinear model to the perturbations of the inputs to generate the partials and often, inherent limitations of the model to operate at some boundary points of the flight envelope. Any such defective or erroneous LEM implies that it does not represent the engine's nonlinear model accurately and hence not suitable to drive controller for the engine. It is important to filter-out these defective LEMs, making sure they are not used later for scheduling. This LEM filtering is represented in blocks 14 and 16, and includes eliminating "outliers" among system-level parameters according to one embodiment as represented in block 14.

Preliminary filtering is implemented by simulating a step response for each LEM and then comparing the LEM step responses to corresponding step responses associated with the non-linear engine model. LEMs having step responses substantially dissimilar to the non-linear engine model are eliminated.

According to one embodiment, additional filtering employs "system metrics" computed for each one of the original LEMs including 1) dynamic parameters (for dominant poles) including natural frequency $\omega_n$, damping $\xi$, and 2) steady-state parameters, including steady-state gains, included but not limited to from control inputs to controlled outputs (e.g., fuel flow to fan speed), steady-state gains from any disturbances inputs to controlled outputs.

These metrics are then plotted against different variables that decided the operating flight envelope such as altitude, aircraft speed, ambient temperature or the power level of the engine and the outliers are identified and eliminated. According to one aspect, the identification is performed visually but, up to some extent, it can optionally be automated; for example, by detecting LEMs with parameters outside some standard deviation $\sigma$ range (e.g., LEMs with steady state or DC gains outside +/−6σ). Two easy-to-implement tests include, without limitation, checking for stability (and eliminating unstable LEMs), and checking the sign of steady-state gains of known sign (and eliminating LEMs having opposite signed gains than the expected sign).

The LEMs remaining (residual set) subsequent to filtering form the basis of two methods of online LEM scheduling as shown in FIG. 1. In what is termed as Method 1, the rectangularity of the residual set of LEMs with respect to the scheduling variables is the deciding factor as shown by block 18. By rectangularity, it is implied that for instance, if the scheduling variables were altitude and ambient temperature and there were, say, 5 altitudes and 5 ambient temperatures that form the scheduling grid, then for each of these 25 grid points, there needs to be a LEM associated. This condition of rectangularity is a prerequisite for most interpolation algorithms. If there are more than two scheduling variables, then accordingly for every combination of the scheduling variables, there needs to be a LEM associated.

As mentioned earlier, due to various reasons, the residual set of LEMs may not be rectangular with respect to the selected set of scheduling variables. In that case, the residual set LEMs from block 16 are then employed to generate LEMS that are used to form the grid or vertex points of one or more lookup tables satisfying the condition of rectangularity with respect to the selected scheduling variables as represented in block 20. To achieve this objective, two algorithmic options are proposed as shown in block 19. The first option is to generate rectangular set of Linear Models (or LEMs in the present embodiment), also called Grid Linear Models using lookup tables built for each element by interpolation using selected scheduling variables. The second option is to use lookup tables built for each element by a polytopic method using selected scheduling variables. In the so built rectangular set of LEMs, there is a table for each one of the LEM coefficients; and the inputs to these tables are the "scheduling variables", whose selection is discussed in further detail below. The parameters for the tables are the LEMs corresponding to the grid points, which come from a uniform sampling of these scheduling variables ranges. A rectangular grid in the scheduling variable space is carefully selected using established rules depending upon the specific application, aircraft engine control in the present case. These LEMs are known as "grid LEMs" and are generated by interpolation of the filtered original LEMs generated in block 16 using one of the two options mentioned in block 19. This interpolation is done according to one embodiment (option 1) using linear interpolation on an element (or coefficient) by element basis to build a lookup table for each LEM matrix element using the elements of the residual LEMs from block 16. In another embodiment (option 2), this interpolation is done via a polytopic approach described in further detail below. In order to populate the entries for each such grid LEM element lookup tables, according to option 1, linear interpolation using the distance metric of the grid scheduling variables from those corresponding to residual LEMs from block 16 is used to select and weigh (in inverse proportion to the distance) the appropriate closest LEM elements to form the grid point LEM element in the lookup table.

If the residual set of LEMs is already rectangular with respect to the selected scheduling variables, then there is no need to follow the process described in block 19. In this case, the elements or coefficients of the residual LEMs are used to form the look-tables for each element corresponding to the selected rectangular set of grid points in the scheduling space.

Subsequent to generation of the grid point LEMs, the desired LEMs are scheduled online as represented in block 20, by interpolating each LEM element using the lookup tables built for that element using selected scheduling variables as lookup table inputs. Natural generic candidates for scheduling variables according to one embodiment are based upon previous knowledge and include, without limitation, operating condition, engine power level, and engine health. More precisely, the list becomes: altitude, engine speed and power level, assuming that other exogenous parameters like bleed and power extraction can be neglected. Deterioration level can be included if the control according to the present embodiment is not robust to this scheduling variable.

The LEM tables generated in block 20 are then embedded into the engine controller algorithm as represented in block 26, such that for a given a set of LEMs, pre-computed for different engine operating conditions, and given a set of current values for the selected scheduling variables, the current LEM corresponding to these variables is then computed using a suitable interpolation scheme. Two approaches to generating the current LEM include, without limitation, 1) one based on the use of lookup tables for each LEM matrix element or coefficient as described earlier as Method 1 and 2) the other based on the concept of a polytopic system described as Method 2 in FIG. 1.

The lookup table approach computes LEMs online from grid LEMs, which were computed offline from the original LEMs according to one embodiment, via a polytopic approach such described as Method 2 in FIG. 1. In another embodiment, lookup tables for each one of the coefficients of the grid point LEM matrix elements are generated using linear interpolation as described earlier as Method 1. Later, the current values of the scheduling variable are used to enter the tables and by interpolation compute the coefficients of the current LEM. For the polytopic approach, the residual set of LEMs as represented in block 16 need not be rectangular with respect to the scheduling variables.

A polytopic system approach, or polytopic method, represented by blocks 22 and 24 to calculate online the scheduled LEM, according to one embodiment includes consideration of a set of N grid LEMs to be used for scheduling, denoted by the LEM systems $S_i$, i=1, ... N, partitioned as represented by $$S_i = [A_i, B_i; C_i, D_i], i=1, \ldots N, \qquad \text{Eq. 3}$$

where $A_i$, $B_i$; $C_i$, $D_i$ are the usual state-space matrices that describe a linear time-invariant continuous-time system. Each one of the systems, $S_i$, is computed for a given set (vector) of scheduling variables. The systems $S_i$ are also known as vertex or grid systems. The residual set of LEMs from block 16 form the basis to compute these vertex systems as shown in block 22. Assume, to keep the notation simpler, there are only two scheduling variables sv1 and sv2. Then, for any given value of sv1, sv2, (as represented in block 24), the corresponding LEM "S" is computed by the convex combination of the LEM systems $S_i$ that is represented by $$S(sv1, sv2) = w_1 * S_1 + w_2 * S_2 + \ldots + w_N * S_N, \qquad \text{Eq. 4}$$

where $w_1 + w_2 + \ldots + w_N = 1$, and $w_i > 0$ for i=1, , N. The weights $w_i$ are functions of the distances between the current values of scheduling variables sv1, sv2 and the scheduling variables corresponding to each LEM, $sv1_i$, $sv2_i$, where the closer the current values are to one of the LEM's values, the higher the corresponding weight, subject to the restrictions on weights given above. The weight function according to one embodiment is represented as $$w_i = \frac{e^{-\gamma d_i}}{\sum_{j=1}^{N} e^{-\gamma d_j}}, i = 1, 2, \ldots N,$$ Eq. 5 where $\gamma$ is a design parameter, and $d_i$ is the distance in the scheduling variable space between the current value of the scheduling variables and the values of the scheduling variables for the $i^{th}$ LEM. According to one aspect, only a few of the vertex LEMs are selected. For example only the ones "closer" to the current point in the scheduling variables space are selected, and zero weights are assigned to the remaining LEMs.

It is noted that prior to computing distances, the scheduling variables are normalized according to one aspect of the invention. According to one embodiment, the range of each one of the scheduling variables is used for this normalization. According to another embodiment, the mean and standard deviation of each one of the scheduling variables associated to all the LEMs in the database is used for this normalization According to another aspect, distances are weighted in different ways; e.g., distances in the engine power level-related variable are desirably weighted more than for other scheduling variables.

The polytopic approach described herein advantageously guarantees stability, under some assumption on the $S_i$ systems. That is, if the $S_i$ systems are quadratically stable or QS (i.e., if there exists a common Lyapunov function for all of them), then any convex combination of these LEMs is (always) a stable LEM. Quadratic stability is a generic property, and thus it holds in general for any set of LEMs. It is noted that obtaining LEMs by any generic interpolation method such as the element by element lookup table as in Method 1 does not guarantee the stability of the computed LEM. Another advantage of the polytopic method over Method 1 of element by element linear interpolation is that the residual set of LEMs need not be rectangular with respect to the scheduling variables. This avoids the extra step as represented by block 19. These two distinct advantages of the polytopic method (described as Method 2 in FIG. 1) hold for any set of linear models that were generated from any given nonlinear model of a physical system.

The polytopic method (termed as Method 2 in FIG. 1) is then embedded into the engine controller algorithm as represented in block 26 for online scheduling of LEMs. The selected scheduling variables and the "Vertex" systems form the basis of this algorithm as described earlier along with certain other tunable parameters.

The polytopic method is also used to generate rectangular set(s) of LEMs using the non-rectangular set of residual LEMs using the selected set of scheduling variables as shown as option 2 in block 19.

It is desirable to have a validation strategy as represented by block 28 in FIG. 1, for the LEM scheduling approach at an early stage; i.e., before going all the way and testing the controller performance over a flight envelope using the scheduled LEMs. The validation process according to one embodiment includes testing against another set of LEMs, not used as the vertex systems $S_i$ or not used to form the element by element lookup tables. If the LEMs computed through the selected LEM scheduling method as represented by blocks 20 or 24, have metrics, such as the selected steady-state gains and dynamic parameters, that are close to the ones for the true test LEMs, the LEM scheduling strategy—method 1 or 2, provides a workable solution.

It is also desirable to validate the choice of scheduling variables as represented by block 30 that applies to both method 1 and method 2. The validation process according to one embodiment involves selection of different sets of scheduling variables as potential candidates to schedule the LEMs and choosing a subset of the grid point LEMs as test set and the remaining set as the set to be used for scheduling. The validation process further involves using the different candidate scheduling variable sets to interpolate the scheduled LEM for all the LEMs in the test set (using the element by element lookup as in method 1 or the polytopic approach as in method 2) and calculating the metrics such as steady state gains and dynamic parameters. Using the closeness of these scheduled test LEM metrics to the true values of the metrics of the test LEMs as the basis, the candidate scheduling variable sets are ranked. The candidate scheduling variable set that ensures the best match can be the desired choice of scheduling variables for scheduling LEMs. This selection process involves repetition using different subsets of the LEMs as test sets and using different criteria to evaluate the match between the parameters of the true and the scheduled test set LEM.

When using the element by element lookup table based interpolation (method 1) or the polytopic method (method 2) described before to compute a LEM for a given set of scheduling variables, the first step is to determine the "distances" in the scheduling variable space between the current value of scheduling variables and the values of the scheduling variables for all the LEMs in the grid set. Then, all these distances are sorted, from smallest to largest, and some criteria are used to decide how many of the closest LEMs participate in the computation of the interpolated LEM; e.g., decide to use the top 10 LEMs. When the total number of LEMs is high (as it is usually, but not necessarily, the case), say 1,000 LEMs, the computational load involved in computing and ranking all 1,000 distances could make the method prohibitive for real-time operation. A "fast implementation" approach as represented by block 32, was developed to address issue, and thus makes the polytopic method or the element by element table lookup method practical in real-time. This fast implementation relies on a lookup table, which has the scheduling variables as inputs and the indices associated to, say, the 10 closest "Vertex" systems or LEMs or rectangular set of LEM elements as outputs (the number 10 here is used without loss of generality). This table is constructed offline (not in real time), by finding the 10 closests LEMs for each one of the table nodes (also referred to as table grid points). In real time, for any given set of scheduling variables, the lookup table outputs the indices of the 10 LEMs or lookup tables of the elements of the corresponding 10 LEMs to be used for the interpolation. Then, the corresponding 10 weights are computed and, finally, used to obtain the interpolated (or scheduled) LEM as the weighted sum of these 10 LEMs using the polytopic method or as the weighted sum of elements corresponding to the 10 LEMs using the element by element lookup table method.

FIG. 2 is a flow chart illustrating a process 40 for generating Linearized Engine Models (LEMs), according to one embodiment of the present invention. It is to be noted that this process in general applies to generating linear models numerically for any nonlinear model of a any physical system. As a first step in this process, the linear model or LEM structure is set up as represented in block 42, i.e. the inputs to be perturbed, their min and max values, the outputs of the LEMs (including their min/max values) and the states. According to one embodiment, one choice for the inputs includes the input actuators, health parameters and at times an input to the model that is not controlled. According to another embodiment, the outputs include all the control outputs that need to be fed back to the engine controller, all the constraint outputs that need to be fed back to the engine constraint controller if present and any other model outputs that are sensed or calculated and needed for control or estimation. According to yet another embodiment, the states of the model include speed states. Other important states of the model can be included as necessary. For example, for an aircraft engine, heat soak and clearance states can be included if they are fast enough to impact the dynamic performance of the engine controller The next step of the process 40 is represented in block 44 and creates a steady state base run which is referred to herein as the baseline for calculating deviations from perturbation run outputs. This step 44 involves three sub-steps, specifically if the nonlinear model of the aircraft engine has a solver—1) getting a baseline, 2) tightening the solver tolerances and getting the baseline again, and 3) modifying the solver to run to the input values obtained in the previous step and getting the baseline again. This baseline is then used to calculate derivatives.

Generating the perturbations is the next step as represented in block 46. The states and inputs are perturbed (i.e. 6 perturbations according to one embodiment) and the outputs of the model are recorded.

The process of interpreting the perturbation run outputs as represented in block 48 involves the calculation of derivatives by dividing the deviation of perturbation run outputs from the baseline by the perturbation magnitude in the inputs and the states of the LEM. The LEM is then stored as a structure that contains the [A, B, C, D] matrices, the envelope conditions it was generated at (for example altitude, engine speed, ambient conditions,), the input base values, the output base values, and the list of input and output variables.

The final step 50 is that of validating the generated LEMS against the offline nonlinear model. This is done by creating verification runs to run the offline nonlinear model through certain input perturbations. At the same time, the same input perturbations are passed to the generated LEM. The output response of the offline nonlinear model and the LEM are then compared. Certain metrics based upon the particular application are then used to judge the goodness and thereby the acceptability of the LEMs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of generating linear models for an aircraft engine system, the method comprising:
   determining, offline, a set of linear models for the aircraft engine system by linearization of a nonlinear model of the aircraft engine system at selected operating points or from desired data;
   analyzing, offline, accuracy of each linear model and eliminating inaccurate linear models therefrom to provide a residual set of the linear engine models;
   generating, offline, linear models corresponding to grid points of one or more rectangular lookup tables based on the residual set of the linear engine models;
   associating, offline, lookup table grid points or the residual set of the linear engine models with selected scheduling variables; and
   generating, offline, algorithmic software for the aircraft engine system therefrom such that the linear models for the aircraft engine system generated offline form a basis for online scheduling of linear models.

2. The method according to claim 1, wherein the desired data are selected from a set of flight envelope and aircraft engine parameters.

3. The method according to claim 2, wherein the set of parameters is selected from engine speed, altitude, power level, ambient temperature.

4. The method according to claim 1, wherein analyzing, offline, accuracy of each linear model and eliminating inaccurate linear models therefrom to provide the residual set of linear models comprises preliminary linear model filtering by comparing, for a number of linear models, dynamic system responses of the number of linear models against similar dynamic system responses of nonlinear computational models.

5. The method according to claim 4, wherein the dynamic system responses comprise step responses.

6. The method according to claim 4, wherein the analyzing, offline, accuracy of each linear model and eliminating inaccurate linear models therefrom to provide the residual set of linear models further comprises generating system metrics for each linear model and eliminating linear models exceeding predefined conditions for the system metrics that render those linear models as outliers with respect to the system metrics.

7. The method according to claim 6, wherein the predefined conditions for the system metrics are selected from dynamic parameters and steady-state parameters.

8. The method according to claim 7, wherein the dynamic parameters are selected from natural frequency and damping.

9. The method according to claim 7, wherein the steady-state parameters are selected from steady-state gains from control inputs to controlled outputs, steady-state gains from disturbances inputs to controlled outputs, and steady-state gains from control inputs/disturbances to constrained outputs.

10. The method according to claim 6, wherein the predefined conditions are selected from a predetermined range of data points and predetermined data point sign conditions.

11. The method according to claim 1, wherein generating, offline, linear models corresponding to grid points of one or more lookup tables based on the residual set of linear models comprises generating the linear models using a polytopic approach using the residual set of linear models as vertex linear models.

12. The method according to claim 1, wherein the basis for online scheduling of linear models comprises interpolation using lookup tables for each element of the linear model.

13. The method according to claim 12, wherein the basis for online scheduling of linear models comprises interpolation using lookup tables for each entry of state-space matrices representing the linear model.

14. The method according to claim 12, wherein interpolation using lookup tables for each element of the linear model comprises generation of a set of linear model element lookup tables rectangular with respect to the scheduling variables if the residual set of linear models are not rectangular with respect to the scheduling variables.

15. The method according to claim 14, wherein generation of the set of linear model element lookup tables rectangular with respect to the scheduling variables is based on using linear interpolation of elements of the residual set of linear models.

16. The method according to claim 14, wherein generation of the set of linear model element lookup tables rectangular with respect to the scheduling variables is based on using a polytopic method operating on the residual set of linear models.

17. The method according to claim 1, wherein the basis for online scheduling of linear models comprises a polytopic method that uses offline grid point linear models to generate online scheduled linear models.

18. The method according to claim 1, further comprising validating the online scheduling of linear models.

19. The method according to claim 18, wherein validating the online scheduling of linear models comprises testing the online scheduling against test linear models not used as grid or vertex linear models.

20. The method according to claim 18, wherein validating the online scheduling method comprises selecting a set of scheduling variables to be used for interpolation.

21. The method according to claim 20, wherein selecting the set of scheduling variables comprises comparing predefined metrics of a test set of linear models to true values when different sets of scheduling variables are used for scheduling or interpolating the test linear models and selecting the set of scheduling variables that gives the closest match.

22. The method according to claim 1, wherein the online scheduling comprises generating current linear models online via the algorithmic software in response to the linear models for the aircraft engine system generated offline.

23. The method according to claim 1, wherein the online linear model scheduling comprises real-time implementation of online linear model scheduling comprising using a lookup table constructed offline to obtain indices of a predetermined number of grid or vertex linear models closest in a scheduling variable space selected for interpolation using an element by element table lookup or a polytopic approach.

24. The method according to claim 1, wherein the basis for online scheduling of linear models comprises interpolating using lookup tables for each element generated using a grid of linear models rendered rectangular with respect to a selected set of scheduling variables using element by element interpolation or a polytopic approach.

25. The method according to claim 1, wherein the basis for online scheduling of linear models comprises a polytopic method that uses offline grid point linear models to generate online scheduled linear models.

26. A method of generating linear engine models offline for use in subsequent online scheduling of current linear engine models, the method comprising :

determining a primary set of linear engine models by linearization of a nonlinear computational model of an aricraft engine at selected operating points or from desired data;

analyzing accuracy of each primary linear engine model and eliminating inaccurate primary linear engine models therefrom to provide a secondary set of linear engine models;

generating the linear engine models corresponding to grid points of one or more lookup tables based on the secondary set of linear engine models;

associating lookup table grid points with selected scheduling variables; and generating algorithmic software configured to assist online scheduling of linear engine models in response to the lookup table grid points and the selected scheduling variables.

27. The method according to claim 26, wherein the desired data is selected from physical and operating parameters of the aircraft engine.

28. The method according to claim 27, wherein the desired data comprises engine speed, altitude, engine power level, and ambient temperature.

29. The method according to claim 26, wherein analyzing the accuracy of each primary linear engine model and eliminating inaccurate primary linear engine models therefrom to provide a secondary set of linear engine models comprises preliminary linear engine model filtering by comparing, for a number of primary linear engine models, dynamic responses of primary linear engine models against dynamic responses of nonlinear engine computational models.

30. The method according to claim 29, analyzing the accuracy of each primary linear engine model and eliminating inaccurate primary linear engine models therefrom to provide a secondary set of linear engine models further comprises generating metrics for each primary linear engine model and eliminating primary linear engine models exceeding predefmed conditions.

31. The method according to claim 30, wherein the predefmed conditions are selected from dynamic parameters and steady-state parameters.

32. The method according to claim 31, wherein the dynamic parameters are selected from natural frequency and damping.

33. The method according to claim 31, wherein the steady-state parameters are selected from steady-state gains from control inputs to controlled outputs, steady-state gains from disturbances inputs to controlled outputs, and steady-state gains from control inputs/disturbances to constrained outputs.

* * * * *